H. A. LOWMAN.
KELP HARVESTER.
APPLICATION FILED NOV. 14, 1917.
1,280,781.
Patented Oct. 8, 1918.
2 SHEETS—SHEET 1.
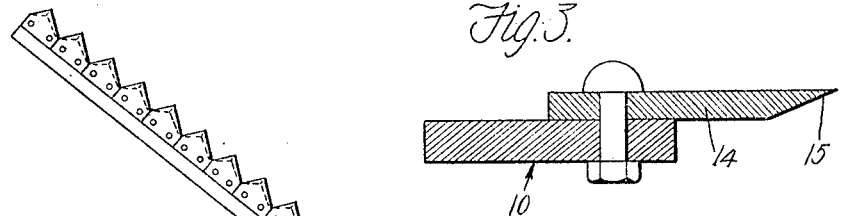
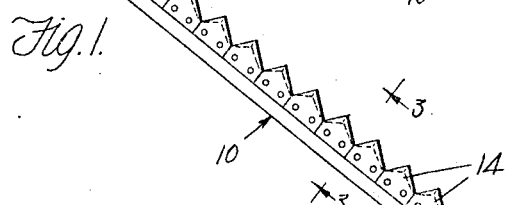
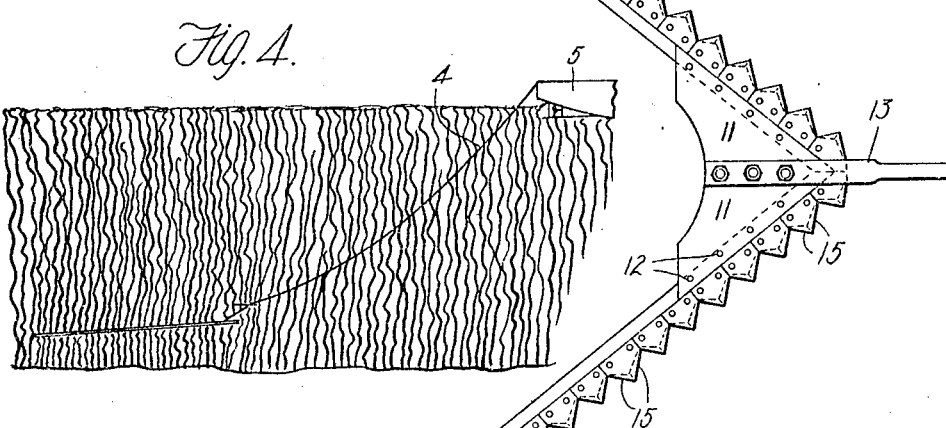
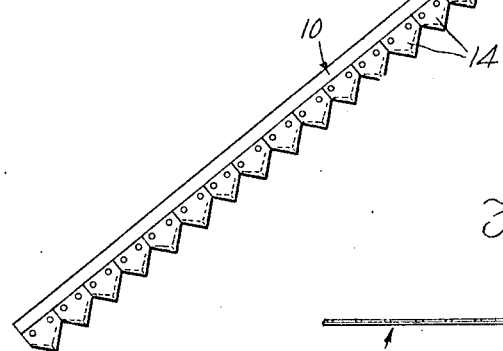
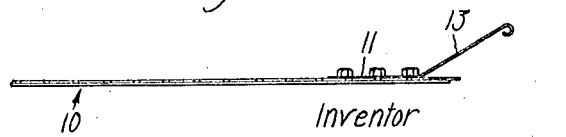
Inventor
Herbert A. Lowman
by *James T Barkelew*
his Attorney H. A. LOWMAN.
KELP HARVESTER.
APPLICATION FILED NOV. 14, 1917.
1,280,781.
Patented Oct. 8, 1918.
2 SHEETS—SHEET 2.
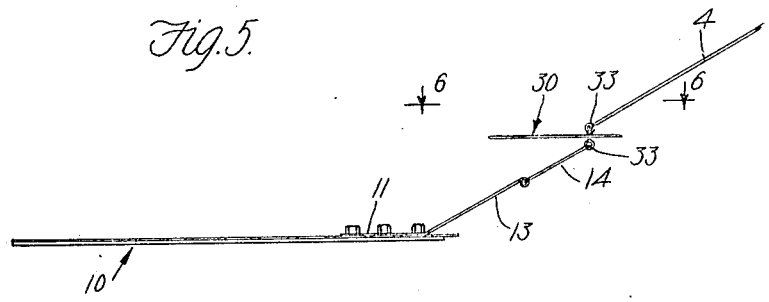
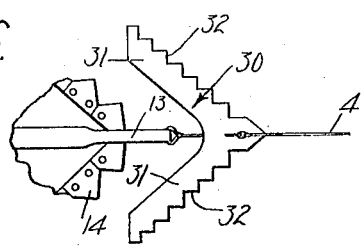
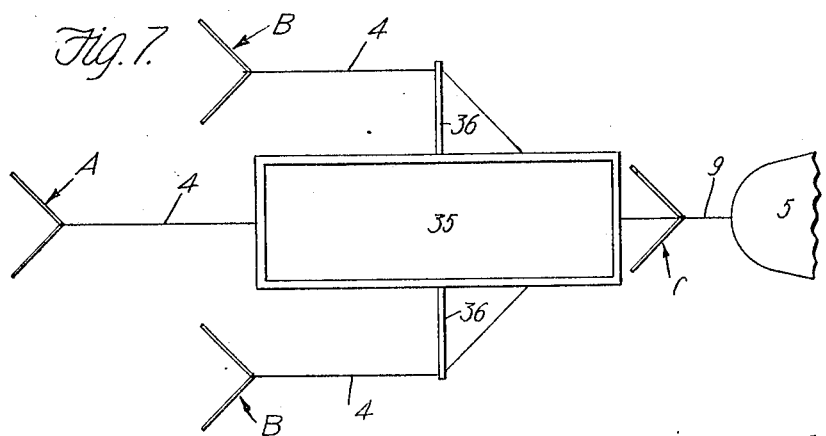
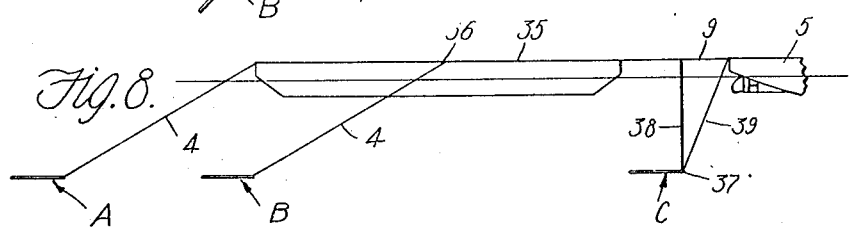
Inventor
Herbert A. Lowman
his Attorney

UNITED STATES PATENT OFFICE.

HERBERT A. LOWMAN, OF WILMINGTON, CALIFORNIA, ASSIGNOR TO SEA PRODUCTS COMPANY, INC., OF LONG BEACH, CALIFORNIA, A CORPORATION OF CALIFORNIA.

KELP-HARVESTER.

1,280,781.  Specification of Letters Patent.  Patented Oct. 8, 1918.

Application filed November 14, 1917. Serial No. 202,012.

*To all whom it may concern:*

Be it known that I, HERBERT A. LOWMAN, a citizen of the United States, residing at Wilmington, in the county of Los Angeles, State of California, have invented new and useful Improvements in Kelp-Harvesters, of which the following is a specification.

This invention relates to devices for submarine harvesting of marine plants; and it has as its object the cutting of marine plants at any desired depth below the water surface. It also has as its object the provision of a simple, effective and efficient means for so cutting marine plants.

In harvesting kelp it has been found that when the upper parts of the kelp are cut and the floating bulbs and leaves removed, the long stems are relieved of their support and of their means of subsistence. These long stems consequently sink to the ocean floor and there disintegrate. It is necessary for the kelp plants to send up new shoots all the way from the ocean floor to the surface before another cutting can take place. It has also been found that a very high percentage of the valuable and desired constituents of the kelp resides in the stems. It seems that it is not detrimental to the plant to remove the whole of the stem and that better values may be obtained by so doing. And accordingly this invention is made for the purpose of economically cutting the kelp as low down as possible or practicable and without detriment to "hold fast" or parent plant from which new growth will sprout.

In the art of harvesting kelp there have been used various kinds of harvesters; but the common characteristic of all harvesters theretofore used has been a float or vessel upon which the harvesting machinery is mounted and supported. I have found it impracticable to use a rigidly mounted and supported harvesting cutter at or near the ocean floor; undulations and variations in the floor making the use of such a mechanism impracticable. My invention takes the form of a cutter which is flexibly supported from a vessel, and is preferably supported by a connection which performs both the office of support and tow connection. My cutter preferably takes a form which, when towed by a vessel at a given speed and with a given length of connection, will take a certain position at a certain depth below the water surface; but is not rigidly fixed in that position. Further, my invention, for this purpose, takes the form of a cutter which is heavier than water and so formed as to be inherently "self-stabilizing"; that is, it will take a definite longitudinal angle and remain transversely in a horizontal position while being towed through the water.

All of these features of my invention will be best understood from the following detailed description of a preferred form of the invention, and of its operation; reference being had for this purpose to the accompanying drawings in which—

Figure 1 is a plan of my preferred form of cutter; Fig. 2 is a partial side elevation thereof; Fig. 3 is an enlarged cross section on line 3—3 on Fig. 1; Fig. 4 is a view showing the use of my device; Fig. 5 is a side elevation showing a modified form; Fig. 6 is a plan on line 6—6 of Fig. 5; Fig. 7 is a diagram showing how my harvester may be operated; and Fig. 8 is a plan showing the same.

In the drawings numeral 10 designates a pair of bars which are disposed angularly or divergently to each other, meeting at their ends, and suitably structurally secured together at the meeting ends by a brace plate 11 and bolts or rivets 12. These bars may, of course be connected in any other manner, they may, for instance be a single bar bent at the forward angle. To this brace plate 11 I connect a tow rod or bar 13, which bar preferably extends either forwardly or forwardly and upwardly. And this bar may be placed either farther forwardly or farther rearward than shown. A tow line 4 is attached to the tow rod and is pulled by any suitable vessel, as is indicated at 5 in Fig. 4.

The outer edge of each bar 10 is provided with a cutting edge of suitable form, preferably knife plates 14 with cutting edges 15 standing at an angle to each other; so that the combined knife plates when assembled on the bars, present a saw-tooth effect.

These knife plates may be detachably mounted upon the bars so as to be removable for sharpening or replacement. Or the cutting edges may be formed in any other suitable manner, and the edge may be of any desired configuration. It may be wavy like a bread knife, or it may be straight.

The operation of my cutter is as follows: The cutter is towed through a kelp bed substantially in the manner indicated in Fig. 4. The depth at which the cutter will ride in the water depends principally upon the weight of the cutter and the length of the tow line 4, and upon the speed of the boat 5. The longitudinal placement and angle of the tow rod 13 may also have an influence on the position of the cutter. From previous practice it is readily known how deep the cutter will float at a given speed and with a given length of tow line. The depth of water in kelp beds is fairly accurately known; and it is possible with my device to tow the cutter close to the ocean floor. If, however, the cutter should strike the bottom, it is immediately deflected upwardly and no injury results.

I have stated that the cutter is heavier than water. It is preferably constructed of iron or steel. Its peculiar triangular shape makes it self-stabilizing. I do not of course limit myself to such particular shape, it being possible to make the cutter of any self-stabilizing configuration. But the triangular shape is simple of construction and a cutter so shaped will maintain itself transversely horizontal at all times.

In order to prevent the kelp from clogging and accumulating around the tow line and rod 13 I may provide a cleaning cutter at 30. This cutter may be a miniature of the larger cutter; it may be made of a single piece of sheet or plate metal with angularly disposed legs 31 and cutting edges 32. Like the larger cutter, this small cleaning cutter may be made in any desired manner as to structure, shape of cutting edge, etc. It is attached in the tow line 4 by two eye bolts or the like 33, as indicated in the drawings. Its forward point is ahead of the tow line and it severs and cleans away any kelp that would otherwise clog around the tow line and tow bar 13; leaving the major part of the cutting to be done by the large cutter.

The cutter, of whatever form it may be, is capable of being drawn or propelled through the water in many manners. Instead of being towed behind a vessel it may be operated from a scow or float 35 as shown in Figs. 7 and 8. It may be towed behind as shown at "A;" towed from laterally projecting booms 36 as shown at "B;" and propelled in front or under the scow as shown at "C." At "C" the cutter is connected at 37 by any swivel joint to an upright 38 which may be mounted on or suspended from the boat or scow in any suitable manner. For instance, it may be attached to the tow line 9 between the boat and scow and may have a brace line 39 running to its lower part from the boat.

Such variations as herein stated, and other variations that may appear to those skilled in the art, may be made without exceeding the scope or departing from the spirit of my invention as expressed in the following claims, which claims are intended to cover the invention in its broad as well as in its specific aspect.

Having described a preferred form of my invention, I claim:

1. A kelp harvester, embodying a cutter adapted to be drawn through the water, means for drawing the cutter through the water, and a cleaning cutter around and ahead of said means.

2. A kelp harvester, embodying a cutter heavier than water, a towing connection by means of which the cutter may be drawn through the water, and a smaller cleaning cutter around and ahead of the towing connection.

3. A kelp harvester, embodying a triangular cutter heavier than water and having towing connection means at one corner and having cutting edges along the sides meeting at the towing corner, a towing support, a tow line, and a small cleaning cutter similar to the first mentioned cutter mounted on and forward of the tow line above and forward of the first mentioned cutter.

4. A kelp harvester embodying a cutter heavier than water, a towing support, and a towing and supporting connection between the towing support and the cutter and flexibly connected with the cutter, whereby the cutter may be towed through the water and assume its own position both as regards longitudinal and transverse balance regardless of the angle of the connection.

5. A kelp harvester embodying a cutter heavier than water, a towing support, and a flexible tow line between the support and cutter to support and tow the cutter through the water, the tow line being flexibly connected to the cutter, whereby the cutter may be towed through the water and assume its own position both as regards longitudinal and transverse balance regardless of the angle of the tow line.

6. A kelp harvester, embodying a triangular cutter heavier than water, a towing support, flexible propelling and supporting connection between the towing support and a corner of the triangular cutter, said connection being flexibly connected to the cutter to allow it to move freely and independently to maintain both longitudinal and transverse balance while being drawn through the water, and serrated cutting edges on the two opposite sides of the triangular cutter.

7. A kelp harvester, embodying a frame having two members secured together at an angle of approximately 60° to each other, a towing connection at the point of frame member connection, and serrated cutting edges on the outer edges of the frame members, said serrations of the cutting edges having forward parts which incline outwardly and backwardly making less than an angle of 90° with the bisector of the angle between the frame members.

In witness that I claim the foregoing I have hereunto subscribed my name this 8th day of November, 1917.

HERBERT A. LOWMAN.

Witnesses:
 L. M. BOWLUS,
 A. H. NEFF.

Copies of this patent may be obtained for five cents each, by addressing the "Commissioner of Patents, Washington, D. C."